US006722281B2

(12) United States Patent
Yamamoto

(10) Patent No.: US 6,722,281 B2
(45) Date of Patent: Apr. 20, 2004

(54) COLOR TONE CONTROL METHOD FOR PRINTING PRESS

(75) Inventor: Shouji Yamamoto, Mihara (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/329,770

(22) Filed: Dec. 27, 2002

(65) Prior Publication Data

US 2003/0136287 A1 Jul. 24, 2003

(30) Foreign Application Priority Data

Dec. 27, 2001 (JP) ....................................... 2001-396935

(51) Int. Cl.7 ............................ B41F 1/54; B06F 15/00; H04N 1/46

(52) U.S. Cl. ........................ 101/484; 358/1.9; 358/500; 358/512

(58) Field of Search .......................... 101/484; 358/500, 358/512, 504, 516, 1.9; 347/19, 43, 14; 400/61, 70, 76

(56) References Cited

U.S. PATENT DOCUMENTS

| | | | | | |
|---|---|---|---|---|---|
| 4,249,807 | A | * | 2/1981 | Webster et al. | 396/548 |
| 4,679,073 | A | * | 7/1987 | Hayashi | 358/516 |
| 4,731,661 | A | * | 3/1988 | Nagano | 358/509 |
| 4,965,663 | A | * | 10/1990 | Sasaki | 358/504 |
| 5,319,472 | A | | 6/1994 | Hill et al. | 358/500 |
| 5,774,202 | A | * | 6/1998 | Abraham et al. | 351/177 |
| 6,132,044 | A | * | 10/2000 | Sternbergh | 351/163 |
| 6,222,640 | B1 | * | 4/2001 | Peulen et al. | 358/1.9 |
| 6,459,425 | B1 | * | 10/2002 | Holub et al. | 345/207 |
| 6,585,340 | B1 | * | 7/2003 | Borrell | 347/14 |
| 6,628,824 | B1 | * | 9/2003 | Belanger | 382/165 |

FOREIGN PATENT DOCUMENTS

| | | |
|---|---|---|
| JP | 09-043058 | 2/1997 |
| JP | 2000-333186 | 11/2000 |
| JP | 2001-047605 | 2/2001 |
| JP | 2001-099710 | 4/2001 |

* cited by examiner

*Primary Examiner*—Daniel J. Colilla
*Assistant Examiner*—Wasseem H. Hamdan
(74) *Attorney, Agent, or Firm*—Armstrong, Kratz, Quintos, Hanson & Brooks LLP

(57) ABSTRACT

A method for providing direct control of the ink supply for printing presses based on an output of a multispectral measurement device includes: obtaining an output of the multispectral measurement from a plurality of printed items which are printed while varying the amount of ink dispensed, utilizing percentage dot area information in print editing from a printing plate for the printed item; determining a transfer function to calculate the amount of ink dispensed corresponding to the amount of change in the multispectral; and computing the amount of ink dispensed to be changed, by using the output deviation in the multispectral measurement output from the target colors for a commercially printed item, and the percentage dot area information related to the target colors of the commercially printed item to control the amount of ink dispensed by the foregoing ink dispensing apparatus.

5 Claims, 8 Drawing Sheets

COLOR TONE CONTROL METHOD FOR PRINTING PRESS

BACKGROUND OF THE INVENTION

1. Field of the Invention

The present invention relates to a color tone control method that adjusts the amount of ink dispensed to a printing press that is controlled by the results of multispectral measurements on printed articles, in particular, it relates to determining a transfer function to calculate the amount of ink dispensed based upon multispectral measurements, wherein the deviation from the target color is taken as the deviation in the multispectral output, and then the aforementioned calculation with the transfer function is used to calculate a corrected amount of ink to dispense as a means to control the color tone for printing press.

2. Description of the Related Art

Since the color reproducibility of printing presses varies according to a number of factors, in order to achieve the desired color tone in a print, it is imperative to use a color tone measuring apparatus to measure a color print and then adjust the color tone by adjusting the ink key, which controls the amount of ink dispensed by the printing press.

For example, in color management systems, in order to match the color reproducibility in individual devices such as printing presses and plate makers, one must determine the percentage dot area for the printing press and the color, for example, something corresponding to the color model as defined by the Commission Internationale de l'Eclairage (CIE L*a*b*) such as the color data called the "profile" by the International Color Consortium (ICC) (hereinafter referred to as the "profile"). Then based upon these elements, digital data must be converted on the upstream side in order to achieve a printed article with measured values that approximate the desired colors to thereby achieve a match to obtain the color reproducibility in a number of devices.

However, even if prints are made using this profile, in order to obtain the color tones exactly as desired, it is necessary to maintain the exact conditions during actual printing that were in place when the printing press's profile was prepared. But sometimes conditions of color reproducibility changes for a printing press, and sometimes conditions under which characteristic data was obtained change during actual printing.

In other words, color reproducibility is affected by small changes in the swing roller pass that evenly applies ink to the ink roller, the movement of the water roller, the printing pressure applied by the rubber roller body, etc. Further there can be variations in the materials used in the inks and printing paper, differences among printing presses, differences in humidity, temperature and in the start time for the printing which can all affect reproducibility, and even if printed at standard concentrations, there are cases where halftones are incompatible.

Accordingly, even when a color management system such as described above is used to prepare printing plates appropriate to a printing profile, for example, as indicated in Japanese laid-open patent application 2001-47605, spectral reflection measurements are made on the color coordinate values (L*a*b*) on actually printed articles (for commercial printed articles), and the concentrations of the inks are calculated in order to control the dispensing of ink. The case is the same when color management systems are not used. Proof prints and test prints (OK sheets) are measured using spectro-reflectometers for commercially printed items and then computations of the ink density are used to control the amount of ink dispensed.

When the amount of ink dispensed is controlled using spectral reflections, and when the spectral reflections are made to a high degree of precision, it is possible to determine correspondingly accurate color coordinates. However, as the resolution becomes finer in order to obtain high precision measurements, it is necessary to increase the number of channels, and so doing causes each signal to be smaller, which intensifies the influence of noise. In addition, the multichannel processing requires a great deal of time, so much as to be difficult to implement on a commercial basis.

At this point, attention was focused upon the redundancy of the spectral reflection wave forms, and an approach involving the learning of these spectral wave forms and then predicting the wave form by using just a few measurements. To wit, the spectral reflection wave forms change smoothly, and by keeping the materials such as ink and printing paper constant, it is possible to learn the characteristics of the spectral reflections in advance, and then, using just a few channels, predict the wave forms and reproduce them to a high degree of precision. Examples of the use of such technology include U.S. Pat. No. 5,319,472, and Japanese laid-open patent application 1997-43058, 2000-333186, 2001-99710, etc.

To wit, in U.S. Pat. No. 5,319,472 discloses a correction method in which 4 or more narrow band filters are interchanged as a picture image signal is obtained by light receptor elements, and then with a black filter (light blocking filter) that is substituted for the foregoing narrow band filter, and using a white sheet in place of the image, the image signals read by each of the narrow band filters are corrected by the signals obtained using the black filter and white sheet, and then, a coefficient is applied to that output in order to obtain the original spectral reflection of the image.

Also, disclosed in Japanese laid-open patent application 1997-43058 is the use of a plurality of band pass filters when scanning original, with the resulting signal being analyzed by statistical methods to compute a classification spectrum for the colors used as a means of determining the classification of the original article.

The method disclosed in Japanese laid-open patent application 2000-333186, illuminates the article to be photographed (the original) with a specific light source, and then using a plurality of filters that transmit different wavelengths, produces output into a plurality of channels of differing spectral sensitivity, and then either a photograph is taken with black and white film, which has an approximately uniform spectral sensitivity in the visible light wavelength range, and the image is scanned, or an image signal is obtained for each filter using a CCD sensor at the imaging position to obtain a wavelength range signal. Then, from that information, a multichannel camera can be used to regenerate the spectral reflectance of the article that was photographed, which provides spectral wave forms for each pixel of the photographed image that can be converted into a control signal for various image reproduction methods.

Japanese laid-open patent application 2001-99710 discloses the photographing of a multi-band image using a variable wavelength filter, which is then used to estimate the spectral reflectance of the article that was photographed. Since the estimated spectral information takes place over a short period of time, the precision of the estimate is not degraded, and the reflectance for each channel of the multi-band image is converted in a pre-prepared table for the corresponding reflectance for brightness values obtained by photographing a known chart. Then the table is used to estimate, in a short period of time, the spectral reflectance of the object photographed based upon the brightness values.

However, with regard to U.S. Pat. No. 5,319,472, as well as with Japanese laid-open patent application 1997-43058, 2000-333186, and 2001-99710, the first, U.S. Pat. No. 5,319,472 relates to a correction method for the spectral reflectance, Japanese laid-open patent application 1997-43058 makes a color classification determination on the article being reproduced, Japanese laid-open patent application 2000-333186 photographs an image with a multi-channel camera and then produces spectral wave forms for each pixel that can be converted into control signals for various image reproduction methods, and Japanese laid-open patent application 2001-99710, quickly estimates the spectral reflectance of an item, and without losing precision, produces estimated spectral information in a short period of time. However, none of these methods relate to printing presses.

Also, when spectral reflectance was used in the prior art for color tone control, as described above, color coordinate values (L*a*b*) and ink concentrations were computed based upon spectral reflectance, and the results were used to control the ink supply, but it required a great deal of time to compute the color coordinate values (L*a*b*) or the concentrations for each of the inks, and the method was further plagued by degraded precision due to the necessity of making the conversions from color coordinate values to ink concentrations multiple times.

SUMMARY OF THE INVENTION

Accordingly, the object of this invention is to provide a method for providing direct control of the ink supply for printing presses from multichannel measurement results.

To wit, the present invention comprises A Color tone control method for a printing press which incorporates an ink dispensing apparatus that can either electronically or mechanically vary the amount of ink dispensed, and which controls the color tone based on a printed item measured by a multispectral measurement means to control said ink dispensing apparatus, said method comprising steps of: obtaining an output of said multispectral measurement means from a plurality of said printed item which are printed while varying the amount of ink dispensed, by utilizing percentage dot area information in print editing or utilizing percentage dot area information measured from a printing plate for said printed item; determining a transfer function to calculate the amount of ink dispensed corresponding to the amount of change in the multispectral output by said output; and computing the amount of ink dispensed to be changed, based on the output deviation in said multispectral measurement means' output from the target colors for a commercially printed item, and said percentage dot area information related to the target colors of the commercially printed item by using said transfer function in order to control the amount of ink dispensed by the foregoing ink dispensing apparatus.

To wit, as described above, since the spectral reflectance wave form changes smoothly, as long as the materials conditions, the inks, paper, etc., remain constant, pre-learning the spectral reflectance makes it possible to closely estimate the original wave forms using just a few channels, and to reproduce a printed item with a high degree of precision. However being able to reproduce the original wave form with a high degree of precision does not mean computing the amount of change required in the ink supply after computing the color coordinate values or ink concentrations from the spectral reflections, rather, it is possible to directly compute the ink dispensation amount from the measurement results. Thus, by precedently determining a transfer function, which is computed based upon the multispectral output changes that corresponded to the amount of change in ink dispensation, it is possible, by just inputting deviation in the output of the multispectral measurement means for the target colors and the percentage dot area information for the commercially printed item, to compute the changes in ink dispensation that are required without computing the changes in the color coordinate values or ink concentration, and to thereby accurately control the color tone without losing precision due to multiple conversions.

Also, according to the present invention, the transfer function is characterized by the configuration wherein the transfer function is determined for the information of each set of printing materials.

Thus, by obtaining the transfer function for each set of materials, printing inks and printing paper, it is possible to use any type of printing materials, and then quickly and accurately control color tones using just a small number of channels for measurement results.

Further, the transfer function is characterized by the configuration wherein the contribution rate is added to determine said transfer function, and said contribution rate includes the amount of the surrounding effects caused by the swing roller movement and amount of ink transfer by using the percentage dot area information in the surrounding area.

Thus, by adding to the transfer function, the contribution rate of effects from the surrounding area, which are caused by movement of the swing roller and the amount of ink transfer from the ink dispensing apparatus, etc., it is possible not only to incorporate the amount of ink dispensation into the transfer function, but also the aforementioned transfer elements of the ink to the printing plate to thereby allow the accurate computation of the amount of ink dispensation to achieve an even more precise control of the color tone.

Further, the number of channels for said multichannel measurement means is determined according to the number of colors to be used by the printing press, and the number of two-color chromatic color combinations.

Since color mixture in offset printing are accomplished by dot overlay rather than by blending inks to create mixed colors, a magnified view of color blended areas on the print will reveal places where there is only one ink present, places where both inks are present, and places where there is no ink at all (the color of the printing paper). As a result, estimating the spectral wave form in the blend areas from the spectral wave forms of the individual blended inks is a complex matter. Accordingly, the number of channels required is determined according to the number of colors used by the printing press, and by the number of two-color chromatic color combinations from those colors. For example, in the case where the four colors of yellow, magenta, cyan and black are used, eliminating the black (an achromatic color) from the 4 colors, there are the following two-color combinations of the remaining 3 colors: yellow-magenta, magenta-cyan, cyan-yellow, thus, a total of 7 channels would be required when the three combinations are added to the four ink colors. As an example of two-color printing, if only two colors such as red and black were used, only two channels would be required since only the red is a chromatic color. Determining the number of channels in this manner eliminates making superfluous measurements and allows the measurements to be performed at a high speed.

Also, the invention is characterized by the configuration wherein said transfer function to calculate the spectral reflectance or color coordinates is determined by said multispectral measurement means.

As described above, characteristic of the present invention is the ability to calculate the amount of ink to be dispensed without calculating the spectral reflectance or color coordinates, however, transfer functions for the spectral reflectance or color coordinates also may be determined exactly as described above. There are times when the spectral reflectance or color coordinates are used for evaluation purposes, and it is therefore desirable to additionally prepare transfer functions for finding these values.

DETAILED DESCRIPTION OF THE PREFERRED EMBODIMENTS

In this section we shall explain several preferred embodiments of this invention with reference to the appended drawings. Whenever the size, materials, shapes, relative positions and other aspects of the parts described in the embodiments are not clearly defined, the scope of the invention is not limited only to the parts shown, which are meant merely for the purpose of illustration.

Figure 1:
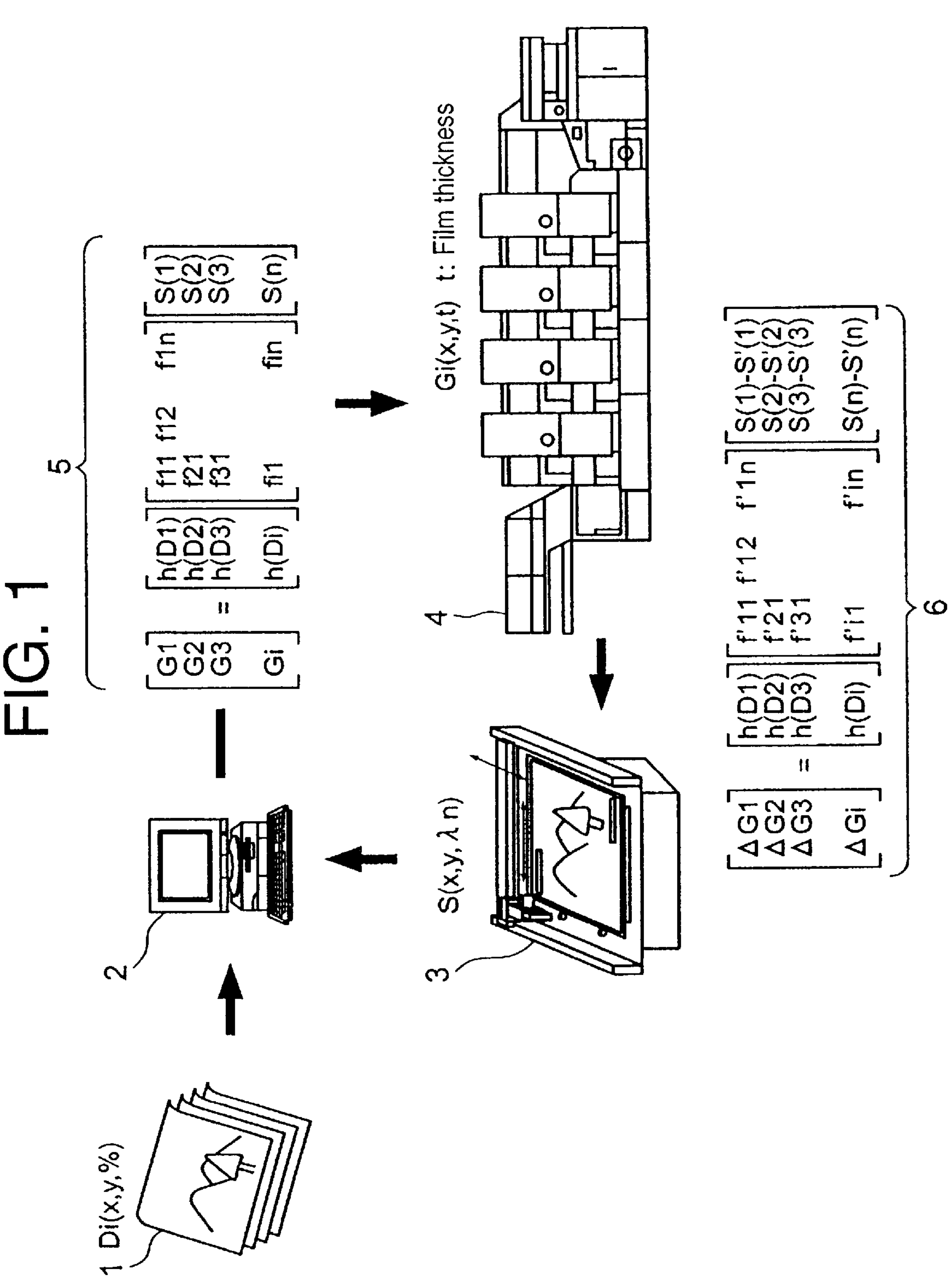
FIG. 1 shows a diagram of the equipment used to implement the color tone control method for printing presses of this invention and the transfer function of this invention.
Figure 2:
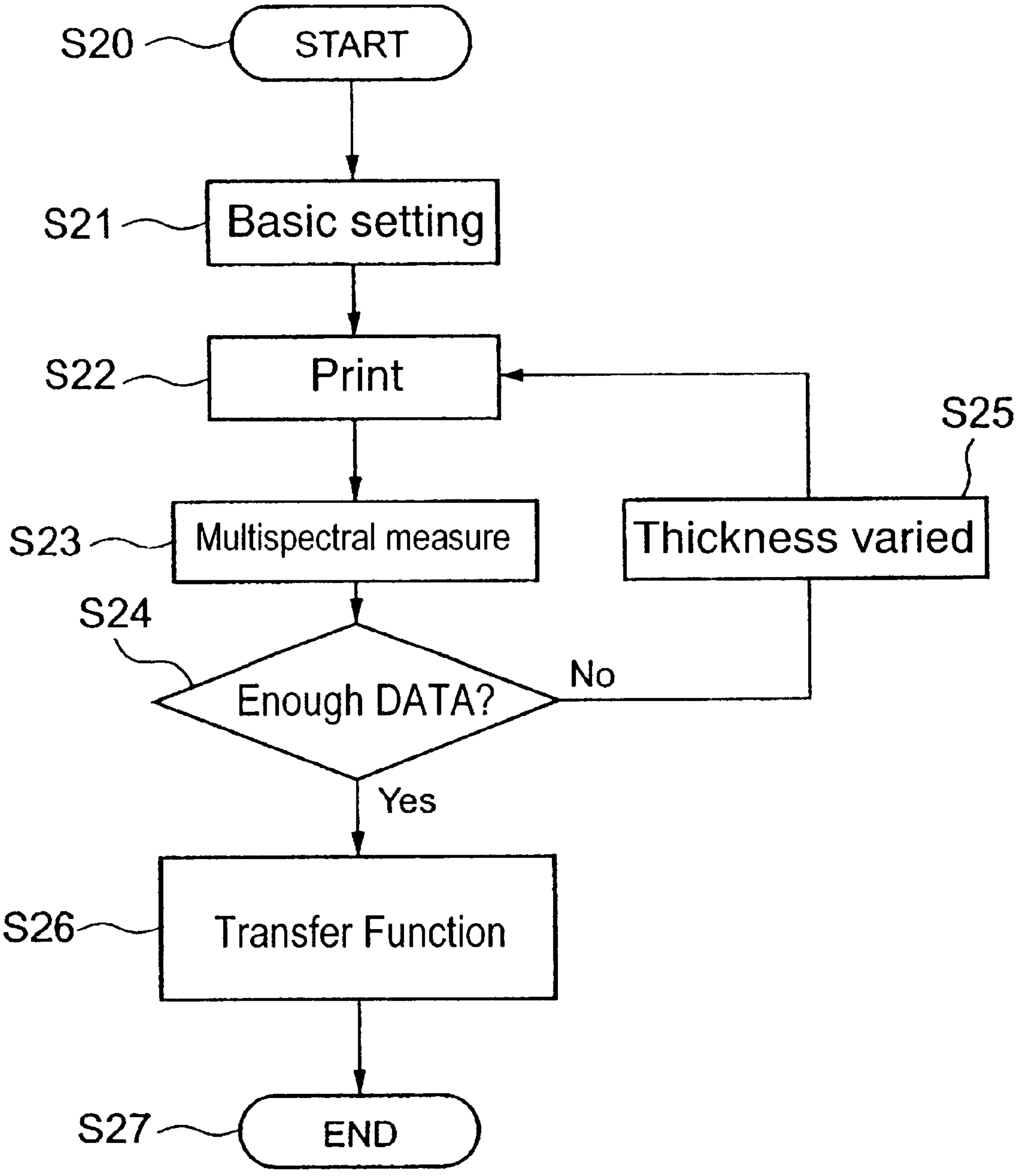
FIG. 2 is a flowchart of the color tone control method for a printing press to calculate the transfer function according to the present invention.
Figure 3:
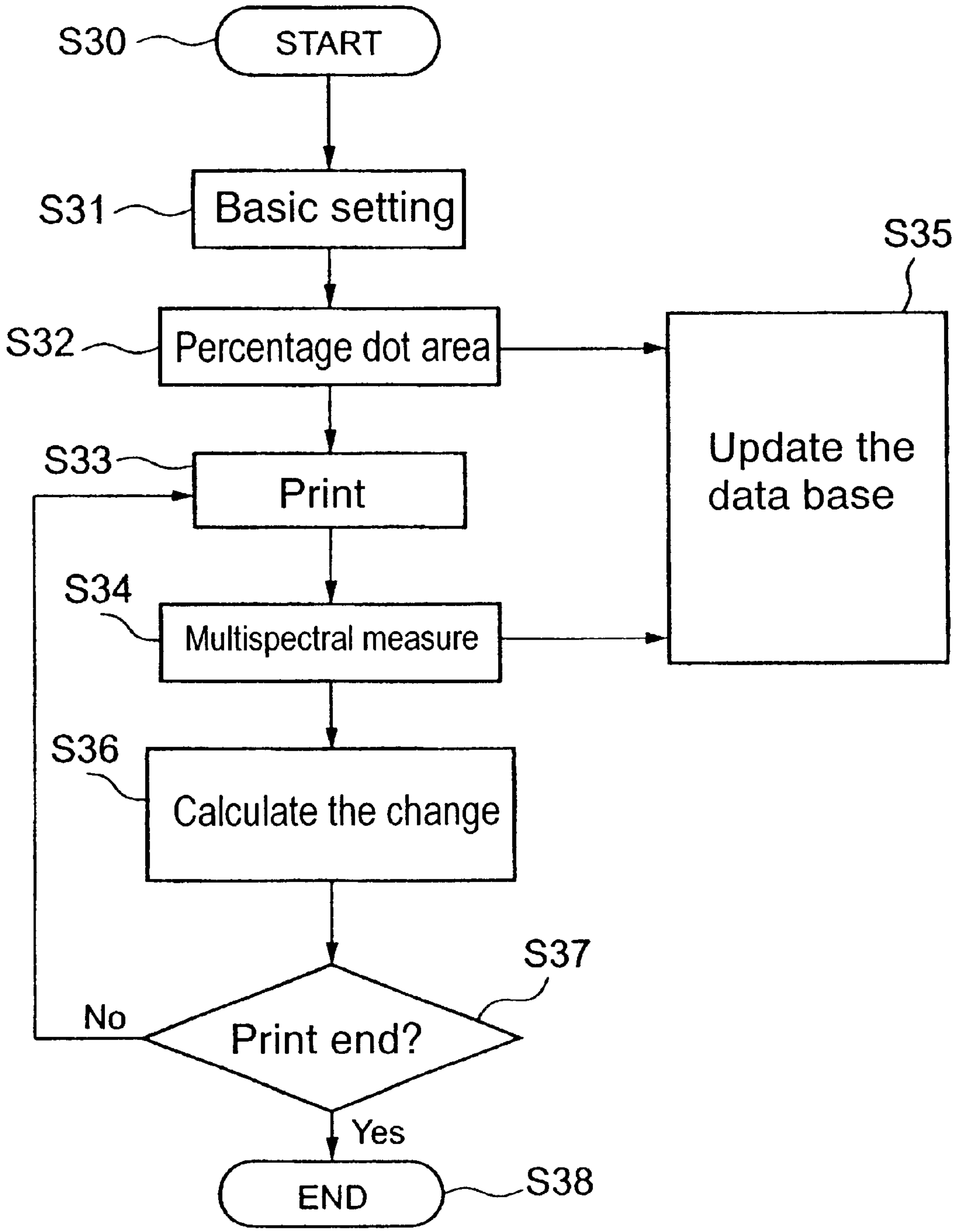
FIG. 3 is a flowchart of the color tone control method for a printing press.
Figure 4:
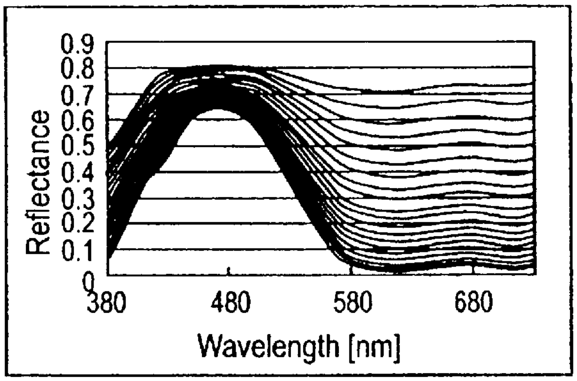
FIG. 4 shows the spectral reflectance of cyan.
Figure 5:
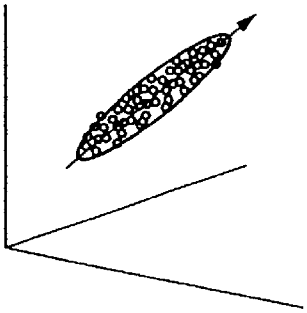
FIG. 5 shows the coloring concept for spatial reflectance.
Figure 6:
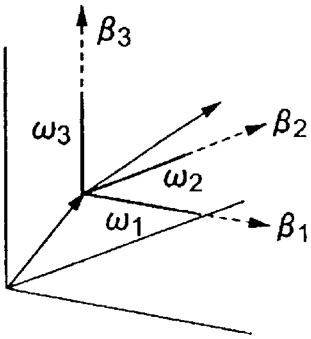
FIG. 6 expresses the spectral reflectance using the main components.
Figure 7A:
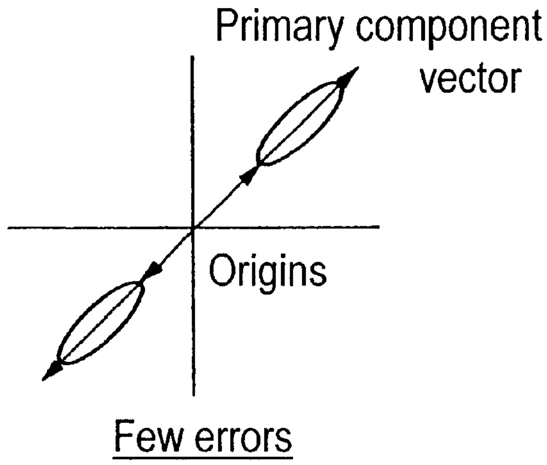
FIGS. 7(A) and 7(B) are concept diagrams that illustrate the use of the Moloney Method to simplify complex computations.
Figure 7B:
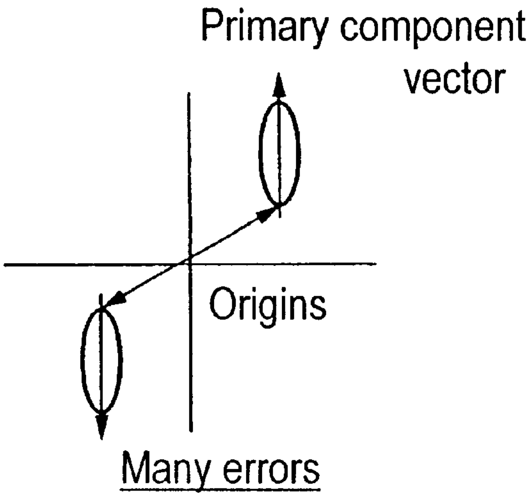

FIG. 1 shows a diagram of the equipment used to implement the color tone control method for a printing press of this invention and the transfer function of this invention. FIGS. 2 and 3 are flow charts of the color tone control method for printing presses according to the present invention. FIG. 4 shows the spectral reflectance of cyan. FIG. 5 shows the coloring concept for spatial reflectance. FIG. 6 expresses the spectral reflectance using the main components. FIGS. 7(A) and 7(B) are concept diagrams that illustrates the use of the Moloney Method to simplify complex computations. FIGS. 8(A)–8(C), 9(A)–9(E), and 10(A)–10(E) are graphs showing the estimated results for spectral wavelength and the number of channels used in the multichannel measurement means.

In FIG. 1, 1 represents the percentage dot area information $D_i$ (x, y, %) during plate making; 2 is the computer that receives the output from multispectral measurement means 3 and then computes the transfer function and the amount of ink dispensation; 3 is the multispectral measurement means that outputs is the spectral reflectance information S (X, Y, λn) for each channel which is the measurement results; 4 is the printing press, which has printing units for a plurality of color components, with each printing unit having an ink dispensation apparatus that can either electronically or mechanically control the amount of ink $G_i$ (x, y, t) that is dispensed; 5 is the formula for the amount of ink dispensed ($G_i$), which is computed by computer 2 using the transfer function ($f_{in}$) which was itself computed based upon inputs of function (h ($D_i$)) of the percentage dot area information $D_i$(x, y, %) during plate making, and the function (S (n)) of measurement output S (x, y, λn) from the multichannel measurement means; and 6 is the formula for computing changes in the amount of ink dispensed ($\Delta G_i$) which uses formula 5 to determine the deviation in the measurement output from the multispectral measurement means 3 (S(n)–S'(n)).

The multispectral measurement means employs a color tone measurement unit that can move, for example, in the X, Y directions. A light receiving sensor mounted in this color tone measuring unit performs the multispectral measurements. The structure used to perform multispectral measurements is described in the above cited examples of the conventional technology: U.S. Pat. No. 5,319,472, and in Japanese laid-open patent application 9-43058, 2000-333186, and 2001-99710. Any of the methods described therein may be used, for example the method that employs a rotatable structure (e.g. motor) to successively position filters that transmit different wavelengths between the light receiving sensor and the printed item, the method using variable wavelength filters, the method that employs a plurality light sources that emit light of different wavelengths in succession, and the method that uses a plurality of light receiving sensors having sensitivity to the reception of different wavelengths, etc.

First, an outline of the present invention will be explained based upon the flow charts of FIGS. 2 and 3. FIG. 2 shows the flow for the calculation of the transfer function used in the method of this invention to control the color tones of the printing press. First, in step S21, the materials to be used in printing press 4, the ink and the printing paper, are set in place, and then the ink supply apparatus in the printing press are controlled to dispense standard amounts of ink, in other words, to produce a film thickness on the ink roller of a standard film thickness $G_i$ (x, y, t) (where t is the film thickness). Also, on the upstream side, a raster image processor (RIP) or the like is used during plate making to produce the percentage dot area information $D_i$ (x, y, %) 1 for each color on the printing plate, said information then being acquired by computer 2.

Then, printing is performed in step S22. In step S23, the printed article undergoes measurement by the multispectral measurement means. Then, the spectral reflectance information for each channel S (x, y, λn) is sent to computer 2, whereupon a determination is made in step S24 of whether the data is adequate, but at present, since the measurements have just begun, the process advances to step S25, where the ink dispensing apparatus of printing press 4 are controlled, to wit, the ink film thickness $G_i$ (x, y, t) on the ink roller is varied. Then, there is a return to step S22 where printing is resumed. Then, as described above, in step S23, measurements are performed by multispectral measuring means 3, and then the spectral reflectance information S (x, y, λn) for each channel is sent to computer 2. This cycle continues until a determination is made in step S24 that an adequate amount of data has been acquired.

In this manner, when the determination has been made in step S24 that an adequate amount of data has been acquired, computer 2, in step S26, uses the spectral reflectance information S (x, y, λ n) obtained from the multispectral measurement apparatus 3, the percentage dot area information $D_i$ (x, y, %) 1, and the ink film information $G_i$ (x, y, t) acquired from the printing press 4, to determine the transfer function F ($f_{in}$) using statistical means, least squares computations, etc. in processing the inputs of the function ($S_n$) of the spectral reflectance information S (x, y, λn), the function ($D_n$) for the percentage dot area information $D_i$ (x, y, %) 1, and the function ($G_i$) for the ink film information $G_i$ (x, y, t). Transfer functions F are predetermined for various combinations of materials, such as inks and printing paper, that were prepared in step S21 in order to be able to handle the various types of materials.

The transfer function obtained as described above can then be used for actual printing, to wit, commercial printing (printing for a customer), and FIG. 3 shows the method of controlling the ink dispensation in flow chart form. First, in step S31 for commercial printing, the required transfer function F must be determined for the specific printing press 4, printing paper and inks that have been prepared for the job, which is the transfer function F($_{in}$) that was determined for those materials. Then, printing press 4 is set to deliver the standard ink dispensation, in other words, the standard film thickness $G_1$ (x, y, t) is applied to the ink roller. Then, in step S32, on the upstream side a raster image processor (RIP) or the like is used during the plate making process to scan the percentage dot area information $D_i$ (x, y, %) for each color into computer 2.

Printing is then performed in step S33. The printed item is then measured in step S34 by multispectral measurement means 3 to determine the spectral reflectance information S' (x, y, λn) for each channel. Then, in the case where the measurement results S' (x, y, λn) for the target colors of the commercial print item differ from the measurement results S (x, y, λn) for the standard film thickness that was produced for the computation of the aforementioned transfer function, first the measurement results S' (x, y, λn), and the percentage dot area information $D_i$ (x, y, %) 1 that were acquired for each color of the printing plate used for the commercial printing in the previous step S32 are stored in and used to update the database in computer 2.

Then, in step S36, the computer 2 computes the difference {S(n)–S'(n)} between the computation results S (x, y, λn) from the foregoing transfer function calculation and the measurement results on the commercial print product S' (x, y, λn), and it then substitutes the results, along with the percentage dot area information $D_i$ (x, y, %) for each color of the commercial print job's printing plate, into the transfer function F ($f_{in}$), the foregoing 6, to determine the amount of change required in ink dispensation ($\Delta G_i$). This change in ink dispensation ($\Delta G_i$) is used to control the ink dispensing devices of the printing press 4, to thereby align the target color tones with the color tones used in the preparation of the transfer function.

Then, in step S37, there is a confirmation of whether or not the printing has been completed, and since the printing had just started, the flow returns to step S33, where printing continues and the above described cycle repeats.

This process makes it possible to convert the measurement results from the multispectral measurement means 3 and directly control the amounts of ink dispensed by the ink dispensing apparatus of the printing press. As mentioned above, the ink dispensing apparatus, which can be electronically or mechanically controlled, can dispense the required amounts of ink $G_i$ (x, y, t) completely automatically. The method also avoids the problem found in conventional methods for computing ink densities from spectral reflectivity or color coordinate values (L*a*b*) due to the lengthy amount of time required for the calculations and the degraded precision that resulted from the need for multiple conversions.

In the above explanation, the determination of the foregoing transfer function was described for the case of only using the spectral reflectance information S (x, y, λn) and percentage dot area information $D_i$ (x, y, %) 1, however, the reproducibility characteristics for the printing press are also minutely affected by the amount movement of the swing roller, which provides a uniform distribution of ink across the ink roller, and by the amount of ink transfer. Accordingly, when determining the transfer function, if such factors are added as the surrounding dot area percentage $D_i$ (x, y, λn) 1, which takes into account the contribution rate to surrounding area of the movement of the swing roller and the amount of ink transfer, it is possible to incorporate not just the ink supply amounts, but the aforementioned elements that affect the transfer of the ink to the printing plate to obtain an even more accurate calculation of the amount of ink to be dispensed, and a more precise control over the resulting color tones.

The above disclosure is a rough concept of this invention, and the more details will be explained with the references of FIG. 4 thorough FIG. 10.

First, this is a method of using a multispectral measurement to obtain accurate spectral reflectance information using just a few channels. The following formula (1) expresses the case for an object having a specific reflectance r (λ), illuminated with E (λ) illumination, with the transmission of the reflected light through a filter being Ti (λ), and a sensor response Vi at a light detector having a spectral sensitivity of S (λ)

Formula 1

$$Vi = \int_{380}^{780} Ti(\lambda) \times E(\lambda) \times S(\lambda) \times r(\lambda) d\lambda \quad (i = 1, \ldots k) \tag{1}$$

In this case, 41 and 81 dimensions are used in order to obtain a sensor response at the conventional 5 to 10 nm pitch [interval] for spectral measurements.

Then, if the dimensions of Formula (1) are substituted with spatial vectors, it can be reexpressed as shown in Formula (2).

Formula 2

$$\begin{bmatrix} V_1 \\ V_2 \\ M \\ V_k \end{bmatrix} = [\, T_1 \;\; T_2 \;\; \Lambda \;\; T_N \,] \times \begin{bmatrix} E_1 & 0 & \Lambda & 0 \\ 0 & E_2 & & \\ M & & 0 & M \\ 0 & & & E_k \end{bmatrix} \times \begin{bmatrix} S_1 & 0 & \Lambda & 0 \\ 0 & S_2 & & \\ M & & 0 & M \\ 0 & & & S_k \end{bmatrix} \times \begin{bmatrix} r_1 \\ r_2 \\ M \\ r_k \end{bmatrix}$$

$$V = T \times E \times S \times r \tag{2}$$

(Note: $T=[T1, T2, \ldots T_k]^t$; Transpose matrix)

When the right and left sides of Formula (2) are of the same order, it is a regular expression. Since it is inverse matrix, the known values of E, S and T are acquired and the reflectivity r is determined from the output V. However, if the dimension of the output V is lower than the dimension of the reflectivity r, the reverse problem exists and general solutions cannot be applied.

However, as shown in FIG. 4 for the spectral reflectance of cyan measured at a 10 nm pitch, the changes in spectral reflectance occur due to the scattering and absorption of the color pigments occur smoothly, which indicates that there is some isolated presence in the 41 dimension vector space. Accordingly, if some are isolated spatially, it is possible to express the main components of that space, by using the spectral reflectance of a known sample's main components, to thereby make it possible to estimate the unknown spectral reflectance to a high degree of accuracy.

The main components can be found by individual solutions to the common spectral matrix. Now, if the known sample's spectral reflectance is:

$r_1=[r_{11}, r_{12}, \Lambda, r_{1p}]^t$ $r_2=[r_{21}, r_{22}, \Lambda, r_{2p}]^t$

M $r_N=[r_{N1}, r_{N2}, \Lambda, r_{Np}]^t$

Then the common spectral matrix may be described as follows.

Formula 3

$$\sum = \begin{bmatrix} c_{11} & c_{12} & \Lambda & c_{1p} \\ c_{12} & c_{22} & & M \\ M & & O & \\ c_{pl} & & \Lambda & c_{pp} \end{bmatrix} \tag{3}$$

The matrix element $C_{ij}$ can be expressed by Formula (4).

Formula 4

$$\begin{aligned} c_{ij} &= \frac{1}{N-1} \times \sum_{k=1}^{N} (r_{ki} - \vec{r}_i)(r_{kj} - \vec{r}_j) \\ &= \frac{1}{N-1} \times \sum_{k=1}^{N} (r_{ki} - \vec{r}_i)(r_{ki} - \vec{r}_i)^t \end{aligned} \tag{4}$$

Here, $r_i$ is the anticipated value for the $i^{th}$ element of r, and is expressed as follows.

Formula 5

$$\bar{r}_i = \frac{1}{N} \times \sum_{k=1}^{N} r_{ki} \tag{5}$$

In the primary component analysis, within the distribution space shown in FIG. 5, the axis with the greatest distribution is taken as the primary. Also, in FIG. 5, all of the sample space is called Y.

Formula 6

$$Y = \alpha_1 R_1 + \alpha_2 R_2 + \Lambda + \alpha_p R_p = \overset{\rho}{\alpha}{}^t \overset{\rho}{r} \tag{6}$$

Thus when expressed as a linear conjunction, the Y must be set at a maximum.

Formula 7

$$\overset{\rho}{\alpha} = [\alpha_1, \alpha_2, \Lambda, \alpha_p]^t \tag{7}$$

However, α is a normalized vector, so $\alpha^t \times \alpha = 1$.

The distribution of Y can be expressed, using the co-dispersion matrix Σ as $\alpha^t \times \Sigma \times \alpha$. The maximization problem may be solved using the Lagrangian unknown multiplier method.

Formula 8

-continued $$\begin{bmatrix} c_{11}-\lambda & c_{12} & \Lambda & c_{1p} \\ c_{12} & c_{22}-\lambda & & M \\ M & O & & \\ c_{pl} & & \Lambda & c_{pp}-\lambda \end{bmatrix} \begin{bmatrix} \alpha_1 \\ \alpha_2 \\ M \\ \alpha_p \end{bmatrix} = 0 \quad (8)$$

to wit, $(\Sigma-\lambda I)\times a=0$ where a solution other than "0" is required. Accordingly, $\lambda$ is the root of $|\Sigma-aI|=0$ the specific value of $\Sigma$. Also, a becomes a specific vector.

The foregoing derivation makes it possible to describe the spectral reflectance as the sum of each of the primary component vectors. Clearly, the primary components can be determined from the individual partial solutions to the sample's co-dispersion matrix. This indicates that the desired spectral reflectance may be expressed by the ortho-normalization of the primary component vectors as shown in FIG. 6, which may be developed as follows:

Formula 9

$$\overset{\rho}{r} = \sum_{i=0}^{k} \omega_i \times \beta_i + \overset{\rho}{h} \quad (9)$$

In order to generalize the formula, the individual vectors are substituted with $\alpha_i$ to $\beta_i$, and the individual values with $\lambda_i$ to $\omega_i$. In particular, $\omega_i$ is defined as the overlapping of the component vectors, but when normalized, it becomes $\lambda_i=\omega_i$.

Here, as is apparent from Formula (9), computational difficulties arise for the offset vector n in the desired space. This can be addressed by using the Moloney method for simplification. That method adds the same number of data groups symmetrically with the origin to cancel out the offset. In this case, this can be realized by inverting all of the symbols in the sample space. However, as is apparent from FIGS. 7(A) and 7(B), error will develop when the direction of the main component vectors differs greatly with respect to the offset vector from the origin. At this point, the development will proceed with the error in place.

Beginning with the results, Formula (10) describes the desired spectral reflectance.

Formula 10

$$\overset{\rho}{r} = \sum_{i=0}^{k} \omega_i \times \beta_i \quad (10)$$

Formula 11

$$\overset{\rho}{r} \cong \overset{)}{r} = \sum_{i=0}^{m} \omega_i \times \beta_i = B \times \omega = [\beta_1 \ \beta_2 \ \Lambda \ \beta_m] \times \begin{bmatrix} \omega_1 \\ \omega_2 \\ M \\ \omega_m \end{bmatrix} \quad (11)$$

The $\beta$ and $\omega$ in Formula (11) can be obtained from the individual solutions for the co-dispersion of the spectral reflectance of the known sample.

Accordingly, a comparison can be made between the spectral reflectance $\hat{r}_p$ from Formula (11) and the spectral reflectance $r_p$ using the following steps:

(1) Preparing the spectral reflectance for a sample group that includes material sample p.

(2) Inverting the sample group's symbols to prepare a group, which is added to the sample group.

(3) Determining the co-dispersion matrix for all of the sample groups.

(4) Solving for the individual members of the co-dispersion matrix and determining the individual vectors B and the individual values $\omega$.

(5) Determine the estimated spectral reflectance $\hat{r}_p$ for the certain material sample. That determination can be made as follows.

Using Formula (10) for all of the spectral reflectance vector space can be established as:

Formula 12

$$\overset{\rho}{r} = \sum_{i=0}^{k} \omega_i \times \beta_i = B \times \omega \quad (12)$$

this, if rewritten for $\omega$, becomes:

Formula 13

$$\omega = B^{-1} \times \overset{\rho}{r} \quad (13)$$

But here, since the individual vector B is a normalized 1 t opposing angle matrix, $B^{-1}=B^t$.

Accordingly, from Formulas (11), (13), the estimated spectral reflectance for the m-order multispectral for the certain material sample $r_p$ is determined by:

Formula 14

$$\overset{)}{r}_p = B \times B_m^t \times r_p \quad (14)$$

Here, $B_m=[\beta_1\beta_2\Lambda\beta_m]$, which is the component from the first order to the m order of the individual vector B.

(6) The difference between the estimated spectral reflectance $\hat{r}_p$ that was determined and the actual spectral reflectance $r_p$ is evaluated for least squares error and $\Delta E$ . . . . Also, the contribution from the selected order (band number: m) can be determined from the following formula.

Formula 15

$$X_m = \frac{\sum_{j=1}^{m} \omega_j}{\sum_{j=1}^{k} \omega_j} \quad (15)$$

From the foregoing development, a method can be devised for estimating the final spectral reflectance from the output V from the m band. To wit, substituting Formula (11) into Formula (2), results in Formula (16) below.

Formula 16

-continued $$V = T \times E \times S \times r \cong T \times E \times S \times \hat{r} = F \times B \times \omega \quad (16)$$

Here, T, E and S are known which are combined into F. Further F×B is a square matrix, and since the illumination, filter transmission rate, and light receptor sensitivity are all independent at the base of the matrix F, it is regular expression with-an inverse matrix. Accordingly, Formula (16) can be solved for ω.

Formula 17

$$\omega \cong (F \times B)^{-1} \times V \quad (17)$$

When this formula is substituted into Formula (10):
ti Formula 18

$$\tilde{r} = B \times (F \times B)^{-1} \times V \quad (18)$$

is thereby derived. Thus, by obtaining the co-dispersed individual spectrums for the sample mother group, the sensitivity of the various systems, as well as the multispectral output, it is possible to estimate the spectral reflectance.

Figure 8A:
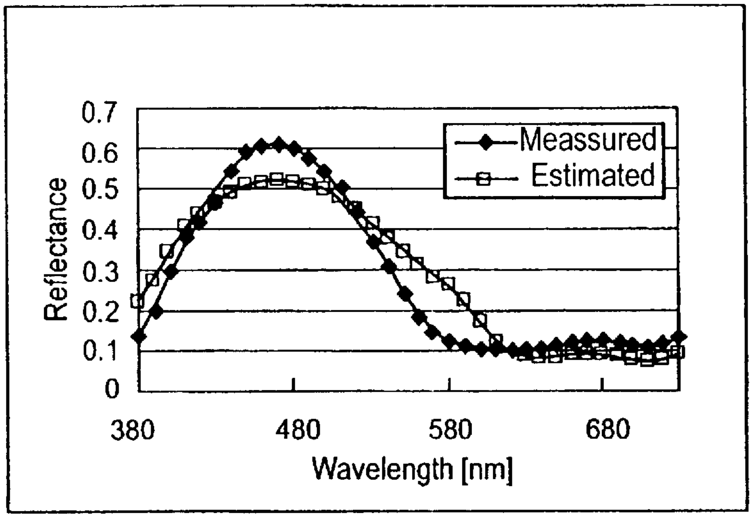
FIGS. 8(A), 8(B), and 8(C) are graphs showing the estimated result for spectral wavelength and the number of channels used in the multichannel measurement means.
Figure 8B:
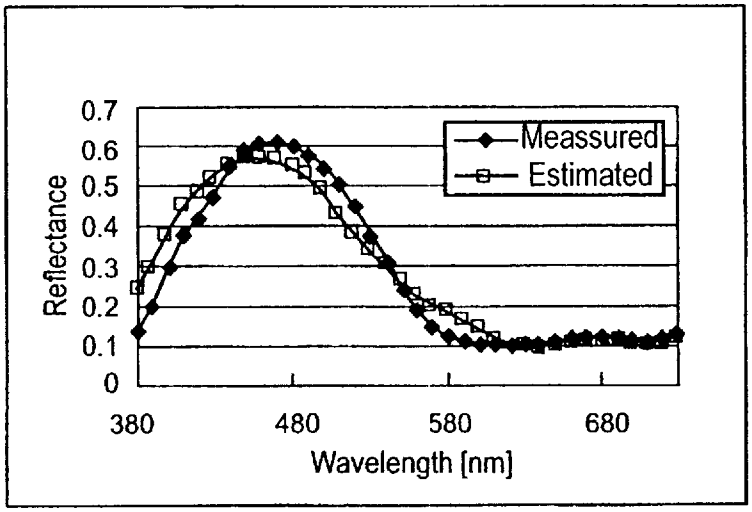
Figure 8C:
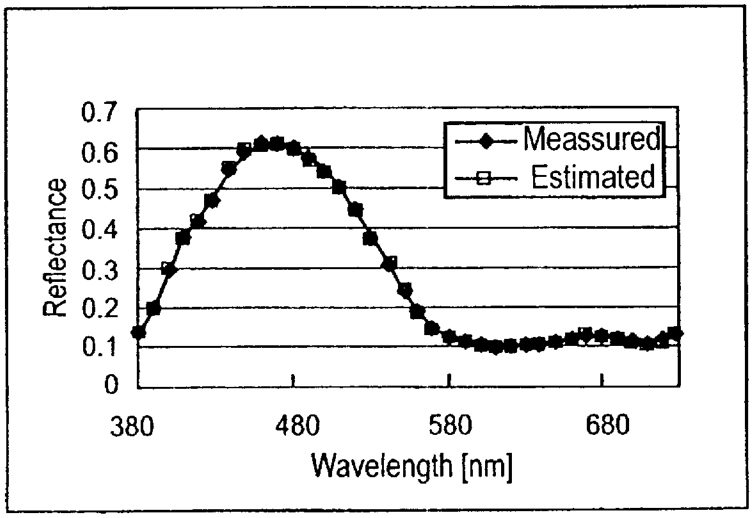
Figure 9A:
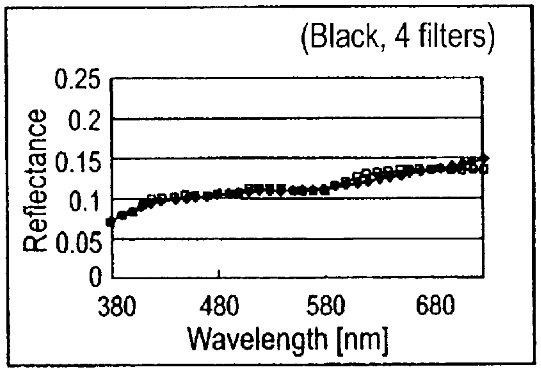
FIGS. 9(A)–9(E) are graphs showing the estimated result for spectral wavelength and the number of channels used in the multichannel measurement means.
Figure 9B:
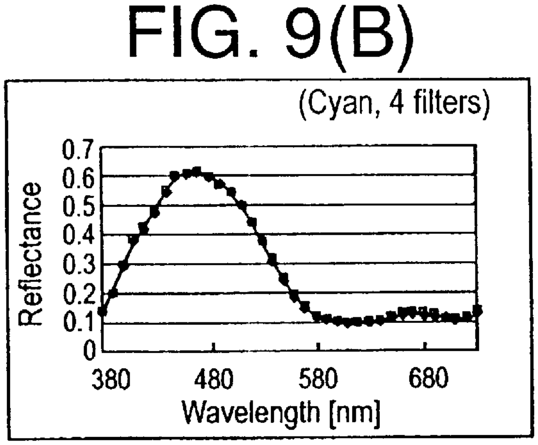
Figure 9C:
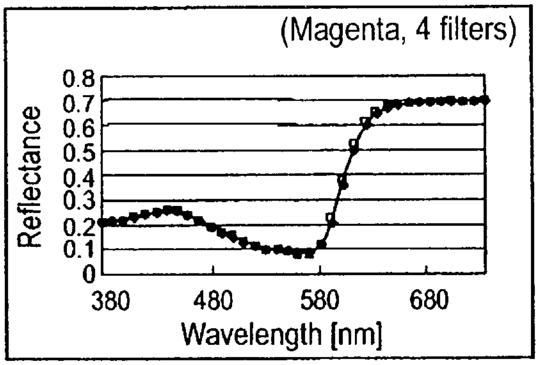
Figure 9D:
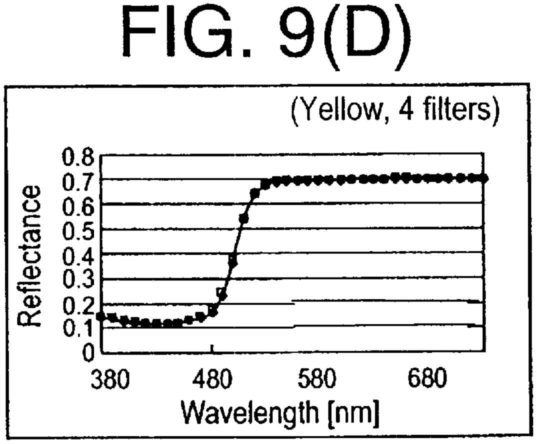
Figure 9E:
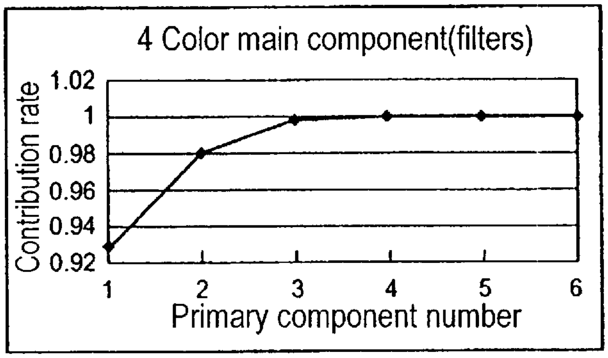

FIGS. 8(A), 8(B), and 8(C) show the results of estimating the spectral reflectance using multispectral measurements. In FIGS. 8(A), 8(B), and 8(C), the graph is for the color cyan when four colors, cyan, magenta, yellow and black were used. The graph with the black square symbols is a graph of the accurate measurement of the band width. The curve with the white square symbols is an estimated graph from the results of measurements after substituting in various wavelength pass filters: FIG. 8(A) is the estimated graph of the measurement results of alternately placing two different wavelengths of pass filters in front of the light receptor, FIG. 8(B) is the estimated graph of the measurement results of alternately placing three different wavelengths of pass filters in front of the light receptor, and FIG. 8(C) is the estimated graph of the measurement results of alternately placing four different wavelengths of pass filters in front of the light receptor. Thus, using four pass filters of different wavelengths products a highly precise estimate.

The same is true for other colors. FIGS. 9(A)–9(E) are graphs of the estimated spectral reflectance from measurement results when using four pass filters of differing wavelengths for black (A), cyan (B), magenta (C), and yellow (D), while (E) shows the estimated contribution rate for the four-color main component using four wavelength pass filters. As is apparent from the figure, when the four different wavelength pass filters are used for a single color, no matter which color, it is possible to accurately estimate the original spectral reflectance.

Figure 10A:
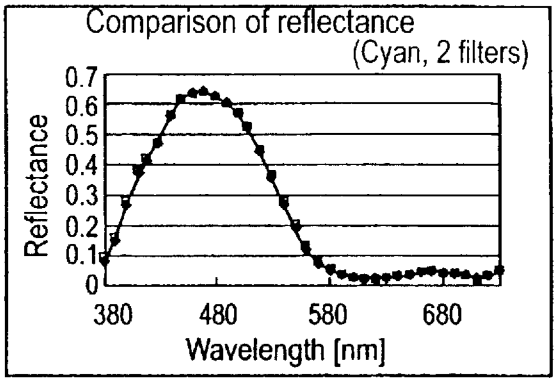
FIGS. 10(A)–10(E) are graphs showing the estimated result for spectral wavelength and the number of channels used in the multichannel measurement means used for mixed colors.
Figure 10B:
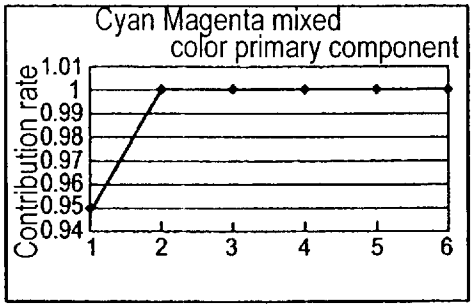

However, for mixed colors, due to dot overlap, the situation is different than it is for blended inks. Viewing the mixed color area of a print under magnification reveals areas where different colors overlap, where there is a single ink color, and where there is no ink at all (where the color of the printing paper remains). Accordingly, such areas are too complex to be able to estimate the spectral wave forms of the overlapping individual inks from the spectral wave forms of ink blends. This is shown in FIG. 10, for example, where the two colors of cyan and magenta were used for printing. Two different wavelength pass filters would be required to make the estimate for the respective colors of cyan and magenta, and as shown by FIGS. 10(A) and 10(B), it was possible to make an accurate estimate for cyan.

Figure 10C:
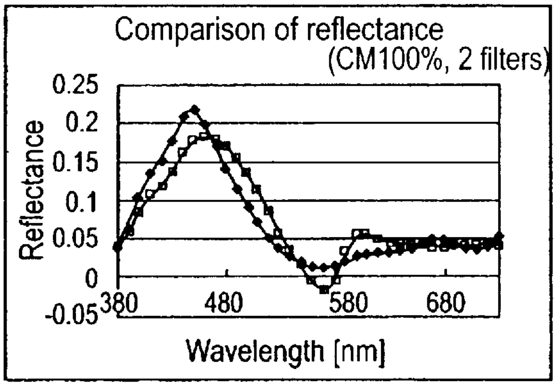
Figure 10D:
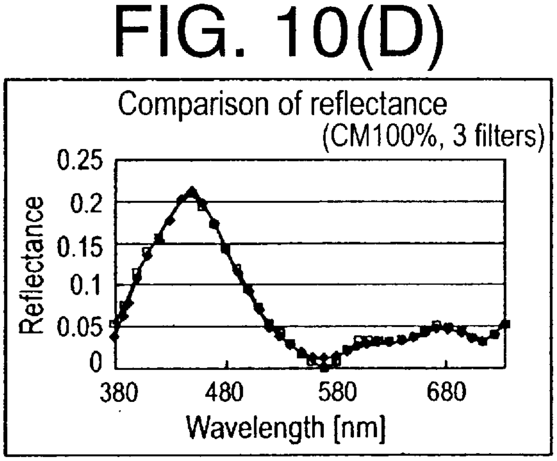
Figure 10E:
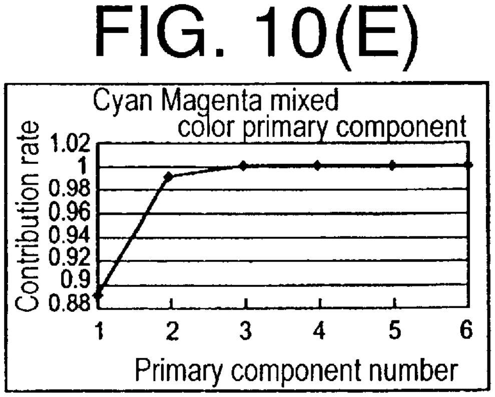

However, as shown in FIG. 10(C) for the case where equal amounts of cyan and magenta were mixed, the precision of the estimate fell off considerably when using just two different wavelength pass filters. But when three were used, as shown in FIG. 10(D), it was possible to obtain an accurate estimate. As shown in FIG. 10(E) for the contribution rate to the estimate with respect to the number of filters used, the use of three filters brings the graph approximately to the 1 level, which indicates that for mixed colors, it is sufficient to add one filter for each color mixture combination. However, in the case of the achromatic color black, as well as grays produced by mixing black and white, the case is not the same as it is for chromatic colors such as yellow, magenta, cyan and their mixtures; it is possible to make an accurate estimate by using only two pass filters of differing wavelengths.

Accordingly, in the case of a printing press set up to use the four colors of yellow, magenta, cyan and black, leaving out the achromatic black, there are three color combinations: yellow-magenta, magenta-cyan, and cyan-yellow, which when added to the single colors, means that 7 pass filters of differing wavelengths can be used. For the case of the two colors of red and black, since only one is a chromatic color, only two filters are required. Thus, it is possible to make the measurements at high speed since superfluous measurements are eliminated.

The foregoing explanation used pass filters of differing wavelengths in making the multispectral measurements, but it clearly would be possible to use variable wavelength filters, to successively use light sources of differing wavelengths, to successively use light receptors sensitive to differing wavelength, or other methods to obtain similar results.

Thus, since the number of channels for the multispectral measurement means is determined by adding the number of colors used by the printing press to the number chromatic color combinations, it is possible to make high precision estimates of the spectral reflectance using just a few channels. Accordingly, as was described above, since it is possible to directly control the amount of ink dispensed by the ink dispensation apparatus from the estimated ink requirements derived from these multispectral measurement results, it is possible to deliver more accurate computations for the ink dispensation because the method avoids the multiple conversions that were required in the prior art to compute color coordinate values from spectral reflectance.

As has been described, one can estimate the amount of ink dispensation from the results of spectral measurement means, and use that information to directly control the ink supply, but in actual printing shops, in many cases spectral reflectance and color coordinate values are used for color evaluation purposes. Accordingly, if transfer functions are determined for the spectral reflectance and color coordinate values at the same time as the transfer function for the amount of ink dispensation, it is possible to achieve a system that will immediately respond to those requirements as well.

Thus, according to the present invention, by determining a transfer function, which is computed based upon the multispectral output changes that corresponded to the amount of change in ink dispensation, it is possible, by just inputting deviation in the output of the multispectral measurement means for the target colors and the percentage dot area information for the commercially printed item, to compute the changes in ink dispensation that are required without computing the changes in the color coordinate values or ink concentration, and to thereby accurately control the color tone without losing precision due to multiple conversions.

According to the present invention, by obtaining the transfer function for each set of materials, printing inks and printing paper, it is possible to use any type of printing materials, and then quickly and accurately control color tones using just a small number of channels for measurement results.

According to the present invention, by adding to the transfer function, the contribution rate of effects from the surrounding area, which are caused by movement of the swing roller, the amount of ink transfer from the ink dispensing apparatus, etc., it is possible not only to incorporate the amount of ink dispensation into the transfer function, but also the aforementioned transfer elements of the ink to the printing plate to thereby allow the accurate computation of the amount of ink dispensation to achieve an even more precise control of the color tone.

According to the present invention, even if the number of the color increases, only the minimum measurement is required, and this eliminates making superfluous measurements and allows the measurements to be performed at high speeds.

According to the present invention, in actual printing shops, in many cases spectral reflectance and color coordinate values are used for color evaluation purposes. Accordingly, if transfer functions are determined for the spectral reflectance and color coordinate values at the same time as the transfer function for the amount of ink dispensation, it is possible to achieve a system that will immediately respond to those requirements as well.

What is claimed is:

1. A color control method for a printing press to control printed color tone, wherein the printing press includes a first device to either electronically or mechanically vary an amount of ink dispensed for each ink color, and a second device to perform a multispectral measurement on a printed item produced by the printing press;

said method comprising steps of:

(a) printing a plurality of test items while varying the amount of ink dispensed, for each ink color, during a test printing;

(b) performing the multispectral measurement on the plurality of item test items which are printed during the test printing while varying the amount of ink dispensed;

(c) determining a transfer function to calculate for each ink color the amount of ink dispensed as a function of changes in the multispectral measurement on the test items and a percentage dot area corresponding to each ink color; and (d) during commercial printing, utilizing the transfer function to compute, for each ink color, a change in the amount of ink dispensed based on a change in the multispectral measurement from target colors of a commercially printed item, whereby the color tone is controlled.

2. The color control method according to claim 1, comprising a step of determining a respective transfer function for various sets of printing materials.

3. The color control method according to claim 1, wherein a contribution rate is added to determine said transfer function, and said contribution rate includes an amount of the surrounding effects caused by a swing roller movement and the amount of ink dispensed by using the percentage dot area information in the surrounding area.

4. The color control method according to claim 1, wherein a number of channels for said multispectral measurement is determined according to the number of ink colors to be used by the printing press, and the number of two-color chromatic color combinations.

5. The color control method according to claim 1, wherein said transfer function to calculate the spectral reflectance or color coordinates is determined by said multispectral measurement.

* * * * *